United States Patent
Lakhanpal et al.

(10) Patent No.: US 8,321,705 B2
(45) Date of Patent: Nov. 27, 2012

(54) DYNAMIC TABLE LOOK-UP BASED VOLTAGE REGULATOR CONTROL

(75) Inventors: Sanjiv K. Lakhanpal, Austin, TX (US); Peter T. Hardman, Kyle, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 483 days.

(21) Appl. No.: 12/577,815

(22) Filed: Oct. 13, 2009

(65) Prior Publication Data

US 2011/0087900 A1    Apr. 14, 2011

(51) Int. Cl.
  *G06F 1/28* (2006.01)
(52) U.S. Cl. .......... 713/322; 713/300; 323/268
(58) Field of Classification Search .......... 713/300, 713/322; 323/268
  See application file for complete search history.

(56) References Cited

U.S. PATENT DOCUMENTS

| | | | | |
|---|---|---|---|---|
| 7,080,265 B2 * | 7/2006 | Thaker et al. | .......... | 713/300 |
| 7,188,261 B1 * | 3/2007 | Tobias et al. | .......... | 713/300 |
| 7,366,929 B1 | 4/2008 | Mimberg | | |
| 7,689,847 B2 * | 3/2010 | Chang et al. | .......... | 713/322 |
| 7,992,015 B2 * | 8/2011 | Verdun | .......... | 713/300 |
| 2005/0093524 A1 | 5/2005 | Hsu | | |
| 2007/0156370 A1 | 7/2007 | White et al. | | |
| 2011/0004774 A1 * | 1/2011 | Hansquine et al. | .......... | 713/310 |

OTHER PUBLICATIONS

Intersil®, "Multi-Output Controller with Integrated MOSFET Drivers for AMD SVI Capable Mobile CPUs," ISL6265, FN6599.1, May 13, 2009, 24 pages.
AMD, "BIOS and Kernel Developer's Guide (BKDG) for AMD Family 10h Processors," Advanced Micro Devices, 31116 Rev. 3.00, Sep. 7, 2007, pp. 1-55.
International Search Report and Written Opinion mailed Feb. 25, 2011 in PCT/US2010/051980, 9 pages.

* cited by examiner

*Primary Examiner* — Thuan Du
(74) *Attorney, Agent, or Firm* — Zagorin O'Brien Graham LLP

(57) ABSTRACT

A technique for dynamically controlling microprocessor power plane voltage levels includes storing in a memory on a voltage regulator voltage control identifiers in a table accessible according to performance state. In at least one embodiment of the invention, a method includes transitioning a voltage output of a voltage regulator to a next voltage level associated with a next performance state of a processor coupled to the voltage regulator based on a performance state indicator received from the processor and a corresponding entry of a performance state table. In at least one embodiment, the method includes loading performance state table entries into a storage device on the voltage regulator circuit.

17 Claims, 3 Drawing Sheets

US 8,321,705 B2

DYNAMIC TABLE LOOK-UP BASED VOLTAGE REGULATOR CONTROL

BACKGROUND

1. Field of the Invention

The invention is related to computing systems and more particularly to dynamic voltage control of computing systems.

2. Description of the Related Art

A typical microprocessor may include multiple power planes, some of which receive fixed voltage levels and others which receive dynamically varied voltage levels. A voltage regulator coupled to the microprocessor provides the dynamically varied voltage to the power planes. The dynamically varied voltage levels may be altered according to various states (e.g., Advanced Configuration and Power Interface power-saving states and hardware thermal control states). The microprocessor communicates a target voltage level to the voltage regulator using a parallel interface or a serial interface, e.g., a parallel voltage level identifier (PVI) interface or a serial voltage level identifier (SVI) interface.

A typical voltage regulator provides voltage levels with multiple bits of precision (e.g., 12-bit precision). The microprocessor sends n voltage identifier codes (where n is the number of power planes supported by the microprocessor) to the voltage regulator. When using a serial interface (e.g., SVI), the microprocessor sends those n voltage identifier codes using a fixed number of pins (e.g., two pins). However, communication of a target voltage level for one or more power planes over the serial interface can be time consuming and impacts the latency of the microprocessor when switching from one performance state to another. When using a parallel approach, the microprocessor requires a number of pins based on n and the number of bits communicated.

SUMMARY OF EMBODIMENTS OF THE INVENTION

A technique for dynamically controlling microprocessor power plane voltage levels includes storing, in a memory on a voltage regulator, voltage control identifiers in a table accessible according to performance state. In at least one embodiment of the invention, a method includes transitioning a voltage output of a voltage regulator to a next voltage level associated with a next performance state of a processor adapted to be coupled to the voltage regulator based on a performance state indicator received by the voltage regulator and a corresponding entry of a performance state table. In at least one embodiment, the method includes loading performance state table entries into a storage device on the voltage regulator circuit.

In at least one embodiment of the invention, an apparatus includes a voltage regulator configured to receive an indicator of a next performance state of a processor. The voltage regulator includes an interface circuit configured to receive the indicator. The voltage regulator also includes a storage circuit configured to store a plurality of voltage identifier codes corresponding to a respective plurality of performance states. The voltage regulator also includes at least one output terminal configured to provide a regulated voltage corresponding to one of the plurality of voltage indicator codes according to the indicator.

In at least one embodiment of the invention, a method includes providing an indicator of a next performance state of a processor. The indicator is a digital code having a number of bits to encode at least voltage regulator table entries corresponding to voltage identification codes. In at least one embodiment of the invention, the number of bits in the digital code corresponds to a subset of voltage identification codes supported by a voltage regulator circuit.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
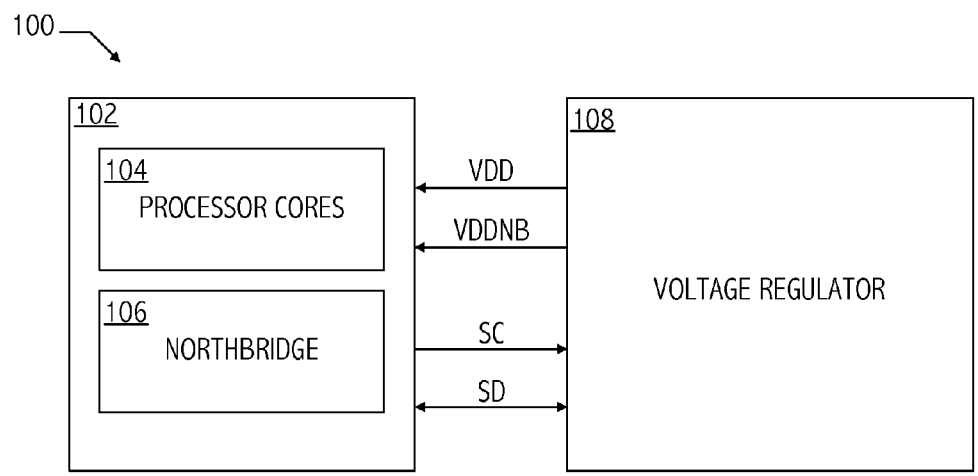
FIG. 1 illustrates a block diagram of an exemplary computing system portion.

Referring to FIG. 1, an exemplary microprocessor (e.g., processor 102) of processor system portion 100 includes one or more processor cores 104 (hereinafter referred to as processor cores 104) and a communication packet routing block (e.g., Northbridge 106). Processor cores 104 receive a power supply voltage, e.g., VDD, from voltage regulator 108. Northbridge 106 receives a power supply voltage, e.g., VDDNB, from voltage regulator 108. In at least one embodiment of computing system portion 100, VDD and VDDNB are connected together on a system board and are controlled as a single power plane. In at least one embodiment of computing system portion 100, a dual-plane platform isolates VDD and VDDNB on the system board and VDD and VDDNB are controlled as separate voltages.

As referred to herein "VID" is a voltage identifier that specifies the voltage level for a particular power plane. Upon power-up, predetermined boot voltage levels are accessed by processor 102 from metal VIDs or by other suitable structure. The boot voltage levels are communicated over an interface (e.g., SVI) to voltage regulator 108 and delivered by voltage regulator 108 to respective ones of processor cores 104 and Northbridge 106 over VDD and VDDNB nodes. Those voltage levels are held at the boot levels until a command including a VID and addressed to voltage regulator 108 requests a change to one or more of those voltage levels. Processor 102 sends at least two bytes of information over the serial interface per voltage plane. A first byte includes a VID code (e.g., 8 bits) and a second byte includes a voltage plane indicator (e.g. two or more bits). Although an SVI requires fewer pins than a PVI, communication of two bytes of data per voltage plane imposes a substantial latency (e.g., 50 µs at 400 kHz). Moreover, as more features are implemented, more power planes are used, and the latency impact increases for an SVI implementation and the number of required pins increases for a PVI interface implementation.

In at least one embodiment, processor 102 supports dynamic P-state changes in two independently controllable voltage planes, VDD and VDDNB, which correspond to the processor cores 104 and Northbridge 106, respectively. However, note that in other embodiments of processor 102, additional independently controllable voltage planes are adjusted according to dynamic P-state changes. In at least one embodiment of processor 102, the SVI interface encodes voltage regulator control commands, including a next VID code, using SMBus protocol over two pins, SVD (data) and SVC (clock), to generate write commands to voltage regulator 108. Processor 102 is the master and voltage regulator 108 is the slave. The SVD and SVC pins are outputs of processor 102. However, SVD may be driven by voltage regulator 108 as well (e.g., to send acknowledgements). SVC is a clock that strobes the data pin, SVD, on the rising edge of a data signal.

In at least one embodiment, voltage regulator 108 is configured to accept the VID codes using the SVI protocol and allow adjustment of VDD and VDDNB voltages in steps (e.g., approximately 12.5 mV steps). However, processor cores 104 may only use a small subset of many VID levels (e.g., five of 128 VID levels) supported by voltage regulator 108. For example, processor 102 may support a small number of operational performance states (P-states), i.e., states in which a processor executes instructions, which are characterized by a unique frequency and voltage.

In at least one embodiment, processor 102 supports only four possible boot VID levels for VDD and up to five P-states (e.g., P-states 0 through 4 or P0 through P4). For example, the highest power, highest performance state is P0. Each ascending P-state number corresponds to a lower power, lower performance P-state than the prior P-state number. Processor power consumption may be altered in any of the P-states using control over the voltage.

Processor core P-states are dynamically controlled by software executing on processor cores 104, e.g., by a software write to a hardware register. Hardware then effectuates the requested voltage change with no additional software action. In at least one embodiment of voltage regulator 108, voltage identifier changes may be slammed, i.e., voltage regulator changes from an old value to a new value without stepping through intermediate values, or stepped, i.e., the VID code is stepped one increment at a time and held at each value for a voltage settling time. When transitioning between P-states, the voltage is either stepped or slammed according to a state of a configuration register.

Figure 2:
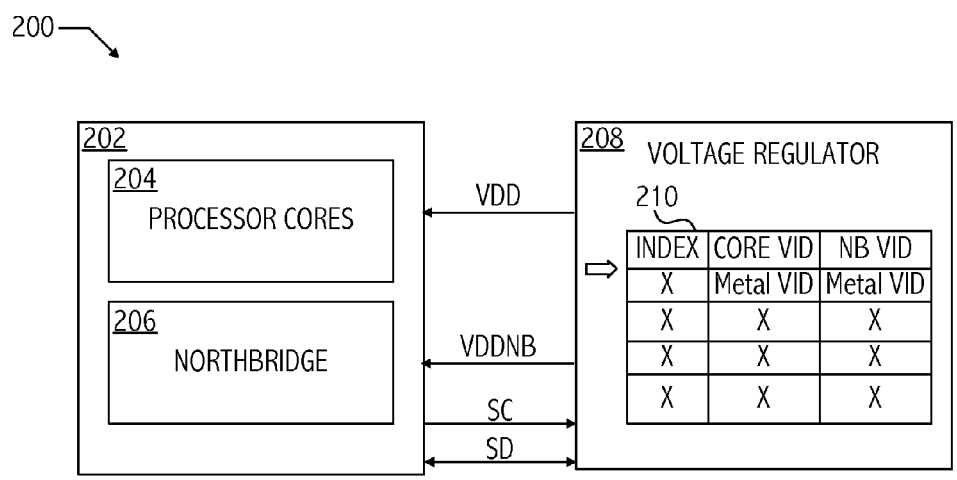
FIG. 2 illustrates a block diagram of an exemplary computing system portion including a memory configured to store boot voltage identifiers consistent with at least one embodiment of the invention.
Figure 3:
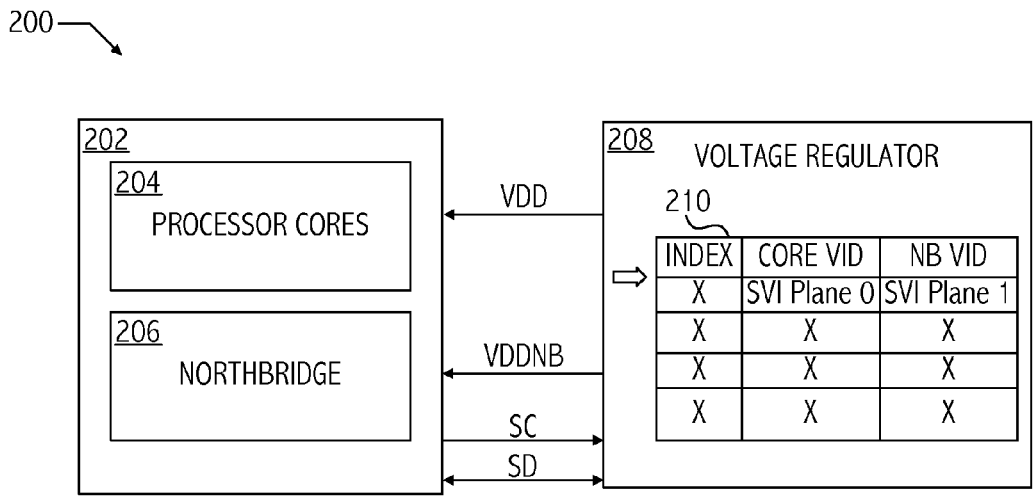
FIG. 3 illustrates a block diagram of an exemplary computing system portion including a memory configured to store maximum operating state voltage identifiers consistent with at least one embodiment of the invention.

A technique for reducing the latency associated with dynamic voltage changes using pins of an existing serial VID interface (e.g., SVI), without additional pins, includes communicating an indicator of a table entry in a lookup table in memory on the voltage regulator. Referring to FIG. 2, an exemplary computing system portion 200 includes processor 202, which includes one or more processor cores 204 (hereinafter referred to as processor cores 204) and Northbridge 206. Voltage regulator 208 includes memory 210 that can be accessed according to any suitable technique based on inputs received from processor 202. Memory 210 may be volatile or non-volatile memory.

In at least one embodiment of voltage regulator 208, the table is indexed using a data pair sent over the SC and SD communication paths. For example, a first set of bits communicated from processor 202 to voltage regulator 208 on SC and SD indicates one or more voltage planes to be updated to a next voltage level. In addition, one or more bits communicated on SC indicate a row and one or more bits communicated on SD indicate a column for indexing table 210 for an entry of table 210 corresponding to a next P-state. Note that in another embodiment, one or more bits communicated on SC indicate a column and one or more bits communicated on SD indicate a row for an entry of table 210 corresponding to a next P-state. In at least one embodiment of voltage regulator 208, a clock pin is included, although embodiments using gray code avoid glitches without an explicit clock pin. Voltage regulator 208 receives the indication of a target P-state, accesses a VID in the table corresponding to that P-state, and updates VDD and VDDNB accordingly.

In at least one embodiment of computing system portion 200, rather than provide a row and column of a particular next state table entry, an indicator of a change in state is provided. An indicator of an increase in performance state from a current performance state or a decrease in performance state from the current performance state is provided. Pulse stepping allows more index entries to be supported without increasing the number of control data pairs required at the cost of higher latency. In at least one embodiment of voltage regulator 208, a combination of binary encoding and pulse stepping i.e., phased keying, is used. Note that memory 210 may be configured for other suitable data structures and accessed accordingly by an indicator communicated from processor 202 by any suitable technique for determining a next state at least partially based on entries in the memory 210.

Referring to FIGS. 2-5, upon powering up computing system 200, one or more boot voltages are set based on predetermined boot voltage identification codes stored in processor 202 (e.g., stored by fuses, metal structures, or other suitable technique) (402). Processor 202 then communicates a maximum voltage identification code to the voltage regulator using the SVI interface and protocol. Accordingly, voltage regulator 208 sets the VDD power plane to a maximum operating state for processor 202, which is used during processor training (404). In at least one embodiment of computing system 200, other suitable information is sent to voltage regulator 208 (e.g., an intermediate start voltage identifier before transitioning to a maximum operating voltage). Processor 202 accesses suitable P-state table information for the processor core (406). For example, the P-state table may be predetermined and stored in memory of processor 202 or selected from several distinct P-state tables stored in memory of processor 202 according to an application configuration of processor 202. Then, processor 202 communicates the selected P-state table information to voltage regulator 208 using the existing serial protocol, and voltage regulator 208 loads that P-state table into memory 210 (408). Next, processor 202 transitions the serial interface to operate using a different protocol, e.g., a table-based indexing protocol. For example, processor 202 changes the state of an appropriate mode register and communicates the state change to voltage regulator 208 (410). Thereafter, voltage regulator 208 handles commands received over those pins (e.g., SC and SD pins of the SVI interface) consistent with the new, table-based indexing protocol or other suitable protocol.

In at least one embodiment, processor 202 communicates a target transition between P-states. For example, a target P-state may be communicated using gray-code encoded inputs with sufficient bit-width for the number of table entries. In at least one embodiment of processor 202, rather than using a gray-code encoded input corresponding to a target P-state, processor 202 transitions between P-states by communicating over the SVI interface an indicator of a target direction of change in state, e.g., pulse steps indicating an increased P-state or a decreased P-state (412). Voltage regulator 208 handles the received command to determine a next voltage state by accessing a VID in table 210 according to the command mode (e.g., row and column or direction of change). Then voltage regulator 208 sets one or more of VDD and VDDNB to the next voltage state.

Figure 4:
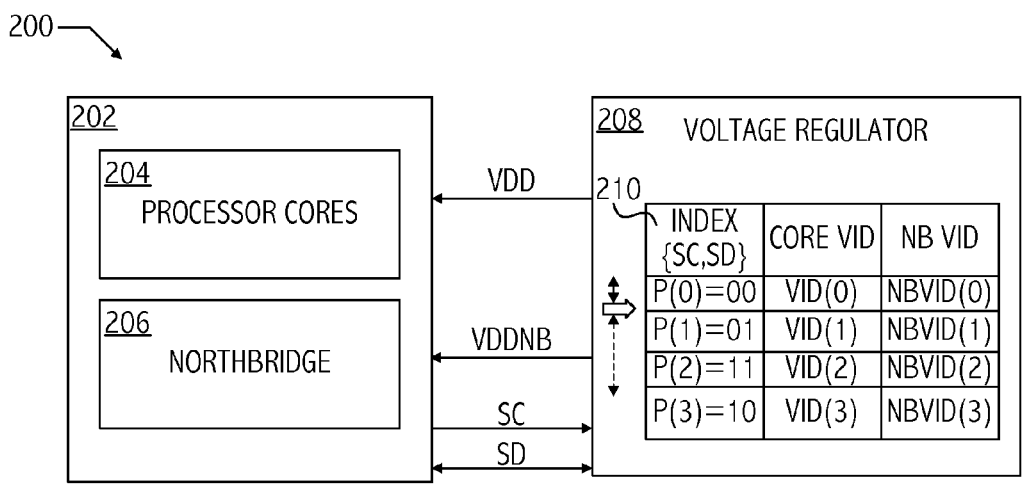
FIG. 4 illustrates a block diagram of an exemplary computing system portion including a memory configured to store voltage identifiers corresponding to multiple performance states consistent with at least one embodiment of the invention.
Figure 5:
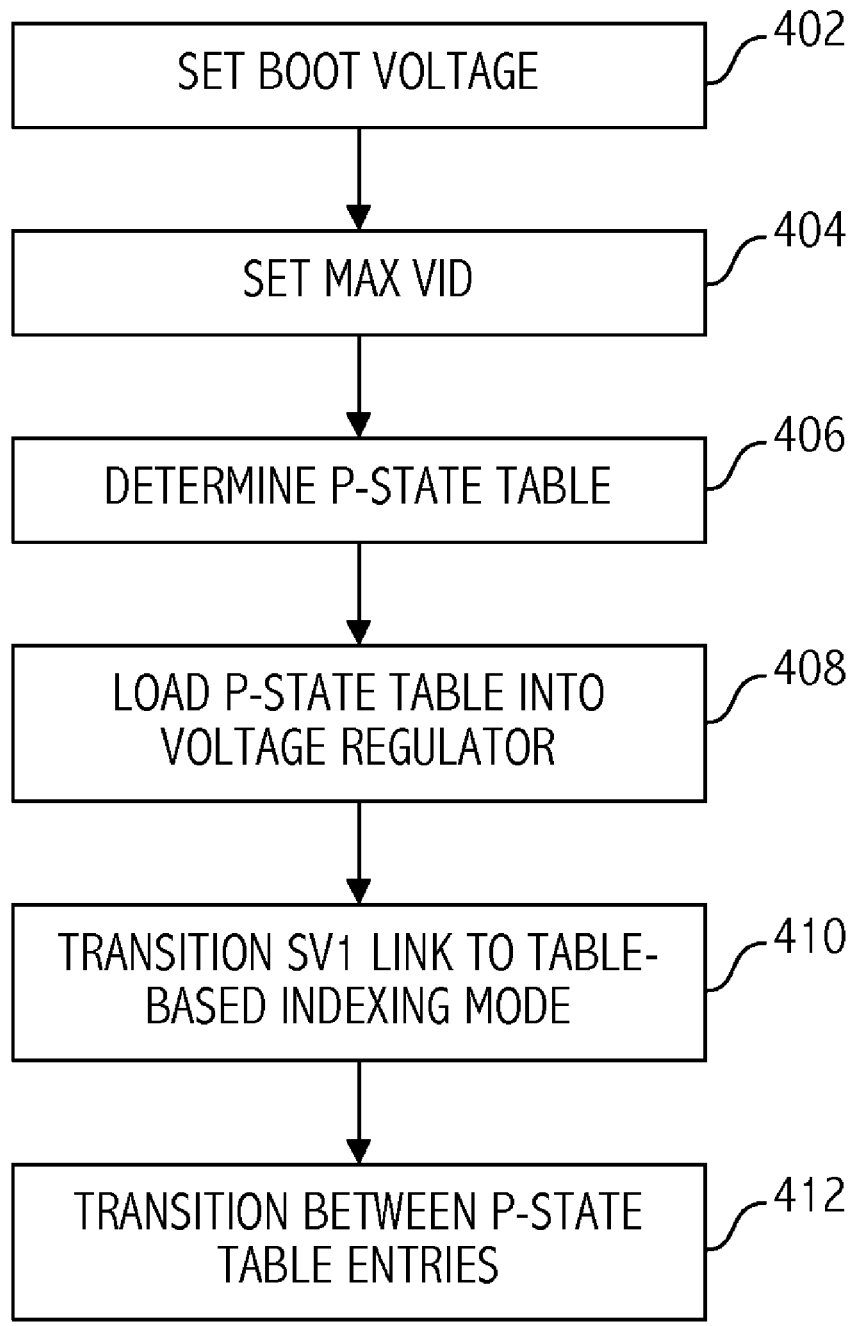
FIG. 5 illustrates information and control flows consistent with at least one embodiment of the invention.

Referring to FIG. 4, table 210 includes entries for each power plane corresponding to each P-state. Although only two power planes are illustrated, memory 210 may include entries for any suitable number of power planes and any suitable number of P-states. Using the techniques described above with regard to FIGS. 2-5, a next VID corresponding to a target P-state may be selected using a performance state indicator that is a digital code having a number of bits to encode at least a number of table entries corresponding to voltage identification codes. The digital code has a number of bits corresponding to a subset of voltage identification codes supported by the voltage regulator circuit. In at least one embodiment of computing system portion 200, processor 202 supports multiple power planes and a number of voltage identification codes that is substantially greater than a number of performances states. An exemplary processor 202 supports five possible P-states and two separate power planes (e.g., VDD and VDDNB), but provides 12-bit precision for the VID, for a possible 128 different VIDs. A corresponding table 210 includes five VID entries per voltage plane. A VID corresponding to a target P-state is encoded using three bits and a corresponding voltage plane may be selected using two bits (e.g., VDD, VDDNB, or both). Thus, a P-state change that required 20 bit times of SVI communications between processor 102 and voltage regulator 108 (which may be two times 20 bit times if VDD and VDDNB values are changed) may be reduced to one to two bit times of communications (e.g., pulse stepping with rollover) between processor 202 and voltage regulator 208.

While circuits and physical structures are generally presumed, it is well recognized that in modern semiconductor design and fabrication, physical structures and circuits may be embodied in computer-readable descriptive form suitable for use in subsequent design, test or fabrication stages. Structures and functionality presented as discrete components in the exemplary configurations may be implemented as a combined structure or component. The invention is contemplated to include circuits, systems of circuits, related methods, and computer-readable medium encodings of such circuits, systems, and methods, all as described herein, and as defined in the appended claims. As used herein, a computer-readable medium includes at least disk, tape, or other magnetic, optical, semiconductor (e.g., flash memory cards, ROM), or electronic medium.

The description of the invention set forth herein is illustrative, and is not intended to limit the scope of the invention as set forth in the following claims. For example, while the invention has been described in an embodiment in which two power planes are used, one of skill in the art will appreciate that the teachings herein can be utilized with multiple power planes. In addition, although the invention has been described in embodiments in which SVI interface pins are used, one of skill in the art will appreciate that the teachings herein can be utilized with different pins and different interface protocols. Variations and modifications of the embodiments disclosed herein, may be made based on the description set forth herein, without departing from the scope and spirit of the invention as set forth in the following claims.

What is claimed is:

1. A method comprising:
transitioning a voltage output of a voltage regulator to a next voltage level associated with a next performance state of a processor adapted to be coupled to the voltage regulator, the transitioning being based on a performance state indicator received by the voltage regulator and a corresponding entry of a performance state table, the transitioning comprising providing a voltage identification code of the corresponding entry of the performance state table, the performance state indicator being a digital code having a number of bits, the number of bits in the digital code corresponding to a subset of voltage identification codes supported by the voltage regulator, a number of voltage identification codes supported by the voltage regulator being substantially greater than a number of supported performance states.

2. The method, as recited in claim 1, further comprising:
loading performance state table entries into a storage device on the voltage regulator circuit.

3. The method, as recited in claim 1, wherein the performance state indicator indicates one or more power planes of a plurality of power planes to be transitioned to the next voltage level.

4. The method, as recited in claim 1, further comprising:
transitioning an additional voltage output of the voltage regulator to an additional next voltage level associated with the next performance state of the processor,
wherein the performance state table includes a second corresponding entry indicating the additional next voltage level.

5. The method, as recited in claim 4, further comprising:
providing the voltage output to a processor core power plane of the processor; and
providing the additional voltage output to a Northbridge power plane of the processor.

6. The method, as recited in claim 1, further comprising:
setting a first voltage output of the voltage regulator circuit based on a predetermined startup voltage identification code.

7. An apparatus comprising:
a voltage regulator configured to receive an indicator of a next performance state of a processor, wherein the voltage regulator comprises:
an interface circuit configured to receive the indicator, the indicator being a digital code having a number of bits to encode an index to a table entry including a voltage identification code, the digital code having a number of bits corresponding to a subset of voltage identifier codes supported by the voltage regulator circuit;
a storage circuit configured to store a plurality of voltage identifier codes corresponding to a respective plurality of performance states, a number of voltage identification codes supported by the voltage regulator being substantially greater than a number of performance states; and
at least one output terminal configured to provide to the processor a regulated voltage corresponding to one of the plurality of voltage indicator codes according to the indicator.

8. The apparatus, as recited in claim 7, wherein the interface uses at most two pins.

9. The apparatus, as recited in claim 7, further comprising:
a processor configured to provide the indicator to the voltage regulator and configured to receive the regulated voltage.

10. The apparatus, as recited in claim 7, wherein the at least one output terminal includes at least two output terminals configured to provide to the processor respective regulated voltages corresponding to respective voltage indicator codes according to the indicator.

11. The apparatus, as recited in claim 7, wherein the at least one output terminal includes a first output terminal coupled to a core power plane and a second output terminal coupled to another power plane of the processor, the first output terminal and the second output terminal being configured to provide different regulated voltage levels.

12. The apparatus, as recited in claim 11, wherein the second output terminal is coupled to a Northbridge power plane of the processor.

13. The apparatus, as recited in claim 7, wherein the indicator indicates one or more power planes of a plurality of power planes to receive the regulated voltage.

14. A method comprising:
   receiving, by a voltage regulator, a performance state indicator from a processor; and
   providing, by the voltage regulator, to the processor, a first next voltage level and a second next voltage level based on a first corresponding entry of a performance state table and a second corresponding entry of the performance state table, the first next voltage level and the second next voltage level being determined based on the performance state indicator.

15. The method, as recited in claim 14, wherein the first corresponding entry of the performance state table includes a first voltage identification code, the performance state indicator being a digital code having a number of bits to encode an index to the performance state table, the number of bits in the digital code corresponding to a subset of voltage identification codes supported by the voltage regulator, a number of voltage identification codes supported by the voltage regulator being substantially greater than a number of performance states.

16. The method, as recited in claim 14, wherein the first next voltage level corresponds to a first power plane of the processor and the second next voltage level corresponds to a second power plane of the processor.

17. The method, as recited in claim 14, wherein the first next voltage level corresponds to a processor core power plane of the processor and the second next voltage level corresponds to a Northbridge power plane of the processor.

* * * * *